March 12, 1963  H. KRAUSE  3,081,118
AUTOMOBILE HOOD LATCH HOUSING
Filed April 4, 1960  4 Sheets-Sheet 1

Inventor
Herbert Krause by Parker & Carter
Attorneys

March 12, 1963     H. KRAUSE     3,081,118
AUTOMOBILE HOOD LATCH HOUSING
Filed April 4, 1960     4 Sheets-Sheet 2

Inventor
Herbert Krause
by Parker & Carter
Attorneys

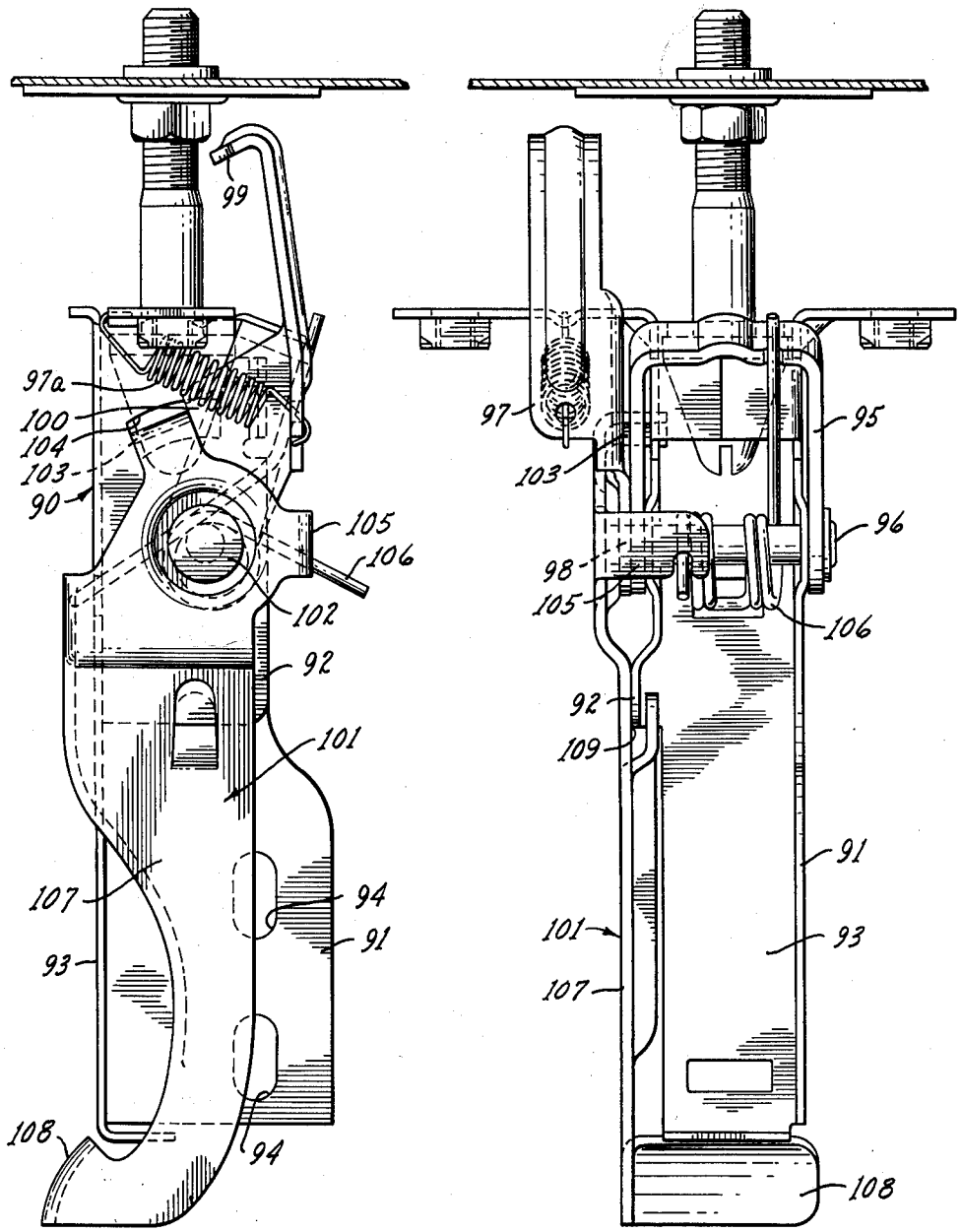

ated Mar. 12, 1963

3,081,118
AUTOMOBILE HOOD LATCH HOUSING
Herbert Krause, Chicago, Ill., assignor to Chicago Forging and Manufacturing Company, Chicago, Ill., a corporation of Delaware
Filed Apr. 4, 1960, Ser. No. 19,855
2 Claims. (Cl. 292—226)

This invention relates to latching means and has particular relation to latching means for automobile hoods and the like.

One purpose is to provide a latching assembly comprising spaced elements effective to produce maximum efficiency in latching an automobile hood cover, for example.

Another purpose is to provide a latching assembly having main latches and a safety latch operable in a plane transverse to that in which the cover to be latched is movable.

Another purpose is to provide a latching assembly particularly effective in providing secure positioning of an automobile cover on the hood of smaller automobiles.

Another purpose is to provide a latch assembly including latch housings formed and adapted to provide the additional function of guiding latching parts.

Another purpose is to provide a latching assembly comprising a pair of spaced latches independently movable in relation to a safety latch positioned intermediately of said two latches.

Another purpose is to provide a latching assembly having a pair of latching groups spaced from each other and from a safety latching assembly effective to preclude complete separation of latched elements in the event of accidental separation at the area of said two latching groups.

Other purposes will appear from time to time during the course of the specification and claims.

I illustrate my invention more or less diagrammatically in the accompanying drawings, wherein:

FIGURE 5 is a side elevation illustrating a variant form of latch assembly, operating means and safety latch embodying features of the invention; and FIGURE 6 is a rear elevation of the structure illustrated in FIGURE 5.

Like parts are indicated by like numerals throughout the specification and drawings.

Figure 1:
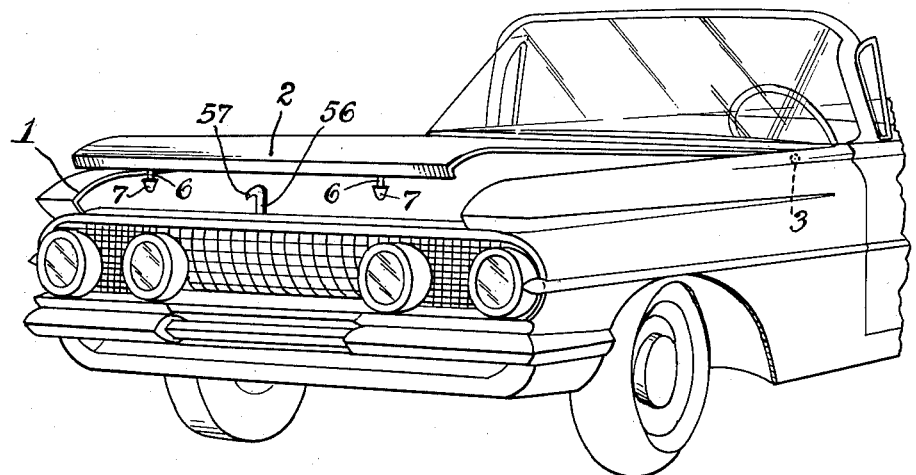
FIGURE 1 is a perspective view illustrating a vehicle portion on which the latch of the invention is mounted.

Referring now to the drawings, and particularly to FIGURE 1, the numeral 1 indicates generally the hood portion of a vehicle body. A cover for the hood 1 is indicated generally by the numeral 2. It will be realized that the cover 2 is hingedly supported on the vehicle adjacent one of its ends, as illustrated generally at 3.

Figure 2:
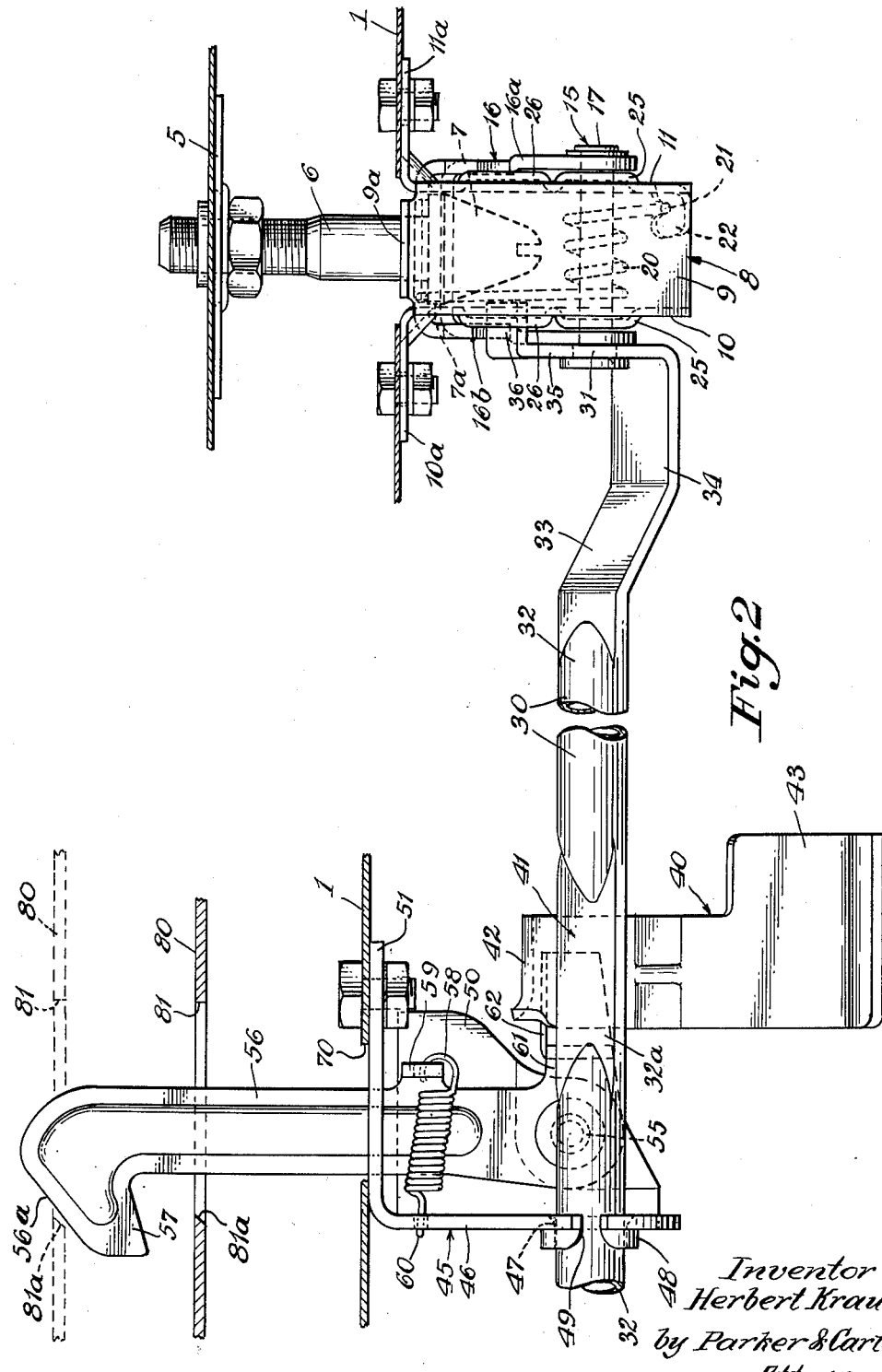
FIGURE 2 is a partial front elevation, with parts in cross section and on an enlarged scale.

Referring now to FIGURE 2, I illustrate, on an enlarged scale, the major elements of my latching assembly. FIGURE 2, constituting a front elevational view, includes the right-hand latching group, the right-hand portion of an actuating rod and the centrally positioned safety latch group. Since the left-hand portion of the actuating rod and the left-hand latching group are essentially identical to the right-hand, they are not shown in FIGURE 2 or described. Only the portions illustrated will be further described.

Secured to a portion 5 of the cover 2 is a downwardly projected keeper shaft 6 carrying at its lower end the latching enlargement 7. Secured to the portion 1 of the vehicle is a latch housing member 8. The housing member 8 has a forward wall 9 of a width substantially equal to the largest diameter 7a of keeper head 7. Extending in parallel planes from the opposite edges of wall 9 are side walls 10, 11 of keeper-receiving housing 8. The walls 10, 11 have outwardly, oppositely directed flange portions 10a, 11a to provide for attachment of the housing 8 to body portion 1. Forwardly extending from the upper edge of wall 9 is a horizontally disposed flange 9a. It will be observed that the flanges 9a, 10a and 11a form a curved surface with their points of juncture with the associated walls. Thus is formed a keeper-receiving, three-sided stroke for reception of the head 7, the forward portion of which, as is known in the art, is conical in overall configuration.

Rotatably mounted as at 15 on the housing 8 is a U-shaped latch member 16. The member 16 has a pair of arms 16a, 16b paralleling and overlying the outer surfaces of housing walls 11, 10, respectively, the ends of arms 16a, 16b being pivotally supported on the shaft 17 extending between the side walls 10, 11. The arms 16a, 16b are joined, at their opposite ends, by the crosspiece 18, a forwardly extending portion 18a of which constitutes the keeper-engaging latching portion of the latch 16. A yielding member such as the spring 20 surrounds shaft 17 between the walls 10, 11. Spring 20 has one of its ends 21 engaging an ear 22 inwardly bent from wall 11 of housing 8. The opposite end 23 of spring 20 engages latch portion 18 as at 24.

The walls 10, 11 may have embossed areas, such as those indicated at 25 surrounding the apertures through which shaft 17 extends and those indicated at 26 serving as strengthening and bearing surfaces.

Figure 3:
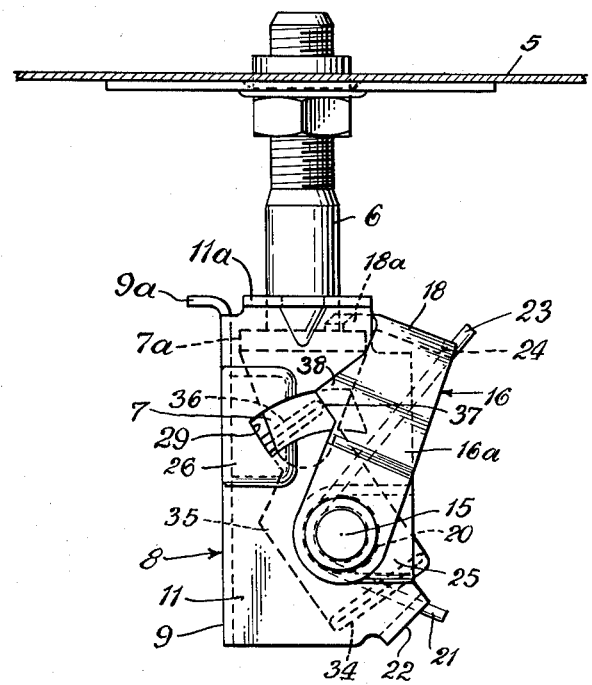
FIGURE 3 is a side elevation illustrating one of the latch subassemblies of the invention.

As best seen in FIGURE 3, one of the side walls 10 or 11, whichever is positioned inwardly of the other with respect to the vehicle, has formed therein an arcuate slot 29 positioned above the level of the pivot shaft 17. An actuating rod 30 extends laterally of the longitudinal axis of the vehicle and has its identically formed opposite ends rotatably supported on an inward extension of shaft 17, the numeral 31 being inserted in the right-hand portion of FIGURE 2 to illustrate this mounting. The shaft 30 has a major central segment 32 which is tubular in form. The portion 32 is flattened at its opposite ends and angularly disposed as at 33 from whence an end portion extends in a path paralleling that of portion 32 as at 34. A perpendicularly disposed flattened portion 35 extends from the portion 34 alongside and outwardly of the inner arm 16b of latch 16, said portion 35 being pivotally mounted as at 31 on shaft 17, the axis of rotation of portion 35 being identical with that of portion 32 of the member 30 and with that of latch 16. The actuating member portion 35 has an outwardly disposed end portion 36 extending through slot 29 and engaging, as indicated at 37 in FIGURE 3, an actuating abutment 38 formed on a forward edge of one of the arms 16a or 16b, whichever is inwardly disposed with respect to the axis of the vehicle to operably engage the latch 16. While the latch arm 16b, for example, as illustrated in FIGURE 2, is outside the juxtaposed wall 10 of housing 8 and while the actuating portion 36 engages the arm 16b outside the housing 8, the extension of actuating portion 36 through slot 29 serves as a stop means for movement of the control member 30.

Referring now to the central portion of FIGURE 2, a manually operable handle element is illustrated at 40 and is secured to member 30 as at 41. Member 40 has an actuating end portion 42 extending beyond the opposite side of member 30 from the manually operable handle segment 43 of member 40.

A bracket member 45 has a vertically disposed wall portion lying in a path paralleling the axis of the vehicle on which it is installed and indicated at 46. The wall 46 has a boss or bearing aperture 47 substantially surrounded by outwardly bent portions of wall 46, as indicated at 48, to receive and form a bearing surface for the central part of tubular portion 32 of member 30. Wall 46 has, along its forward edge and in substantial diametrical alignment with opening 47, a slot 49, a portion 49a of which extends beyond the aperture 47. A flattened portion 32a is formed in tubular portion 32 adjacent the central portion thereof. It is to this flattened portion 32a that member 40 may be conveniently secured. Member 40 does not, however, overlie the entire extension of flattened portion 32a of member 30 and is inserted in supportable relationship into aperture 47 by sliding the flattened portion 32a through slot 49 until the tubular portion 32 of member 30 is aligned with opening 47, after which portion 32 may be slidably moved through aperture 47 to the position illustrated, for example, in FIGURE 2.

Figure 4:
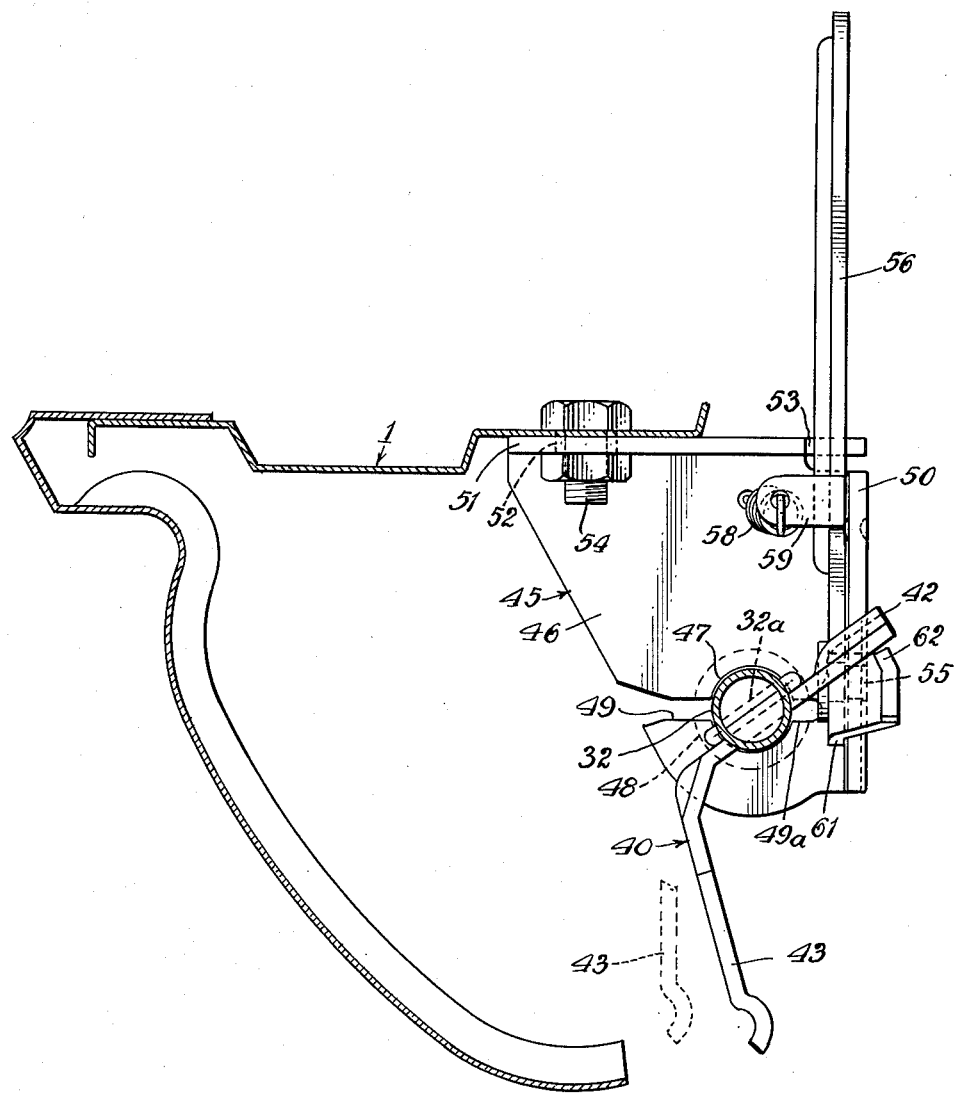
FIGURE 4 is a side elevation illustrating the operating means and safety latch mechanism of the invention.

Bracket member 45 has a rear wall portion 50 disposed substantially perpendicular to wall portion 46 and substantially paralleling the axis of member 30. Wall portion 50 has its upper edge positioned below the upper edge of wall portion 46. An upper wall portion 51 extends from the upper edge of wall 46 in a substantially horizontal plane overlying member 30. The portion 51 is apertured as at 52, illustrated best in FIGURE 4, and is slotted as at 53. Apertures 52 provide for attachment of bracket member 45 to the vehicle by any suitable attachment means such as those illustrated generally at 54 in FIGURE 4. Rotatably supported on bracket portion 50, as at 55, is a safety latch member indicated generally at 56. Safety latch member 56 has a major portion extending upwardly from pivot point 55 and terminating in a safety hook segment 57. A yielding member 58 operatively engages an ear 59 on safety latch 56 at one end of member 58 and engages, at its opposite end, the wall 46 as at 60 to urge the latch 56 toward latching position, as illustrated in FIGURE 2. Laterally disposed from its major portion, safety latch 56 has an operatively engageable abutment arm 61 in substantial alignment with pivot point 55 and carrying the abutment edge 62 beneath and in position to be engaged by operating handle portion 42. It will be observed, perhaps best in FIGURE 4, that safety latch segment 56 extends from pivot point 55 upwardly through slots 53 formed in the upper or attaching wall segment 51 of bracket 45, and that safety latch 56 is mounted for pivotal movement in a plane substantially perpendicular to that in which latches 16 are arranged for movement toward and away from latching position.

Referring now to FIGURES 5 and 6, the numeral 90 designates generally a keeper-receiving housing having an upper portion substantially identical to housing 8, illustrated in FIGURES 2 and 3. In view of this identity the upper portion of housing 90 will not be further described. The housing 90, however, has a set of elongated side walls 91, 92 joined by an elongated cross wall 93. Mounting apertures such as those illustrated at 94 are formed in one or both of the side walls 91, 92 for additional rigidity of the housing 90 when installed. A latch 95, corresponding substantially to latch 16, is pivoted upon a pin 96 extending between walls 91, 92. The pin 96 extends outwardly beyond one of the side walls of housing 90 a distance sufficient to permit the pivotal mounting thereon of a safety latch member 97, having one of its ends pivoted on pin 96, as indicated at 98, and its opposite end formed in the configuration of a safety hook, as indicated at 99. A second yielding means 97a has its opposite ends secured to housing 90 and an intermediate portion of latch 97 to urge said latch toward latching position. A laterally projecting operating abutment 100 is formed on safety latch 97 intermediate its ends and positioned in substantially parallel relationship with an abutment on latch 95 corresponding to that indicated at 38 in FIGURE 3.

A manually operable actuating lever 101 is pivoted on the extending portion of pin 96 as indicated at 102 adjacent one end of lever 101. An operating ear 103 extends laterally from lever 101 adjacent pivot 102 for engagement with the abutments formed on latch 95 and safety latch 97, the ear 103 extending through an arcuate slot 104 formed in the adjacent side wall of housing 90 and serving to limit the movement of lever 101.

A second ear 105 extends laterally from lever 101 adjacent pivot 102 and yielding means 106 is coiled about pin 96 between side walls 91 and 92, the spring 106 having its opposite ends in yielding engagement with ear 105 and latch 95 to urge the lever 101 toward non-operating position and to urge latch 95 toward keeper-engaging position.

The lever 101 has an elongated intermediate portion 107 lying alongside and paralleling the adjacent side wall of housing 90. A laterally extending hand-engageable element 108 is formed at the lower extremity of lever 101, the handle portion 108 lying beneath and slightly forward of cross wall 93.

Whereas I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:
As the hood cover 2 approaches the hood 1 the keeper heads 7 are brought into juxtaposition with the opening formed by the curved joinder of flanges 9a, 10a, and 11a with associated walls 9, 10 and 11 of housing 8 and an aperture 70 formed in an aligned portion of hood cover 2 is in interpenetrating alignment relationship with safety hook segment 56. The walls 9, 10 and 11 of the latch housings 8 are arranged to guide and exactly receive the heads 7 of keeper shaft 6 and to direct the same into central position between walls 10 and 11 of housings 8, and thereafter to prevent sideward vibration thereof. As the heads 7 engage latching portions 18a of latches 16, the same are forced out of alignment with the path of keeper heads 7 until the heads 7 and their major circumferential portions 7a have passed beneath the latching edges 18a at which time the yielding means 20 is effective to return the latching portion 18a into latching engagement with the heads 7, as indicated best in FIGURE 3. The latches 16 are effective to retain the keeper shafts 6 and heads 7 against longitudinal vibrational movement.

The hood cover 2 has a central under portion indicated diagrammatically and in part at 80 and having formed therein the aperture 81. As hood cover 2 approaches closed position on hood 1 the aperture 81 interpenetrates with safety latch portion 56. An edge 81a of aperture 81 engages an inclined upper edge 56a of safety latch member 56 and urges latch 56 away from latching position until the edge 81a has passed beneath the safety hook portion 57 of latch 56. The parts are so dimensioned as to cause engagement of safety latch 56 with hood cover portion 80 prior to engagement of keepers 6 with latches 16.

When the operator desires to open hood cover 2, it is necessary only to raise the manually operable handle 40 by grasping the handle segment 43 thereof and lifting it. Handle portion 42 then engages safety latch abutment 62 to rotate safety latch 56 out of latching position, or clockwise as the parts are shown in the drawings. Simultaneously with this action, upward movement of handle 40 causes rotation, in clockwise direction, of operating shaft 30 and, through the medium of abutments 36 and 37 on shaft 30 and latch 16, the upward raising of handle 40 causes rotation of latch 16 out of latching position. With all three latches thus moved to nonlatching position, the hood cover 2 is completely unlocked.

The device of FIGURES 5 and 6 retains all of the advantages resulting from the formation of a keeper-receiving housing having upper wall portions effective to serve the dual function of attachment means and keeper-guiding elements, as well as those resulting from employment of the side and cross walls of such a housing as both a keeper-receiving and -securing means, eliminating the necessity for any sparate keeper-enveloping or -retaining cup and the like. In FIGURES 5 and 6 an independent assembly is shown wherein the housing 90 is further employed as a mounting member for an actuating lever 101, the elongated walls of the housing 90 being secured to the vehicle and providing, as by the engagement of the lever 101 with one of the housing side walls, such as that indicated at 109, effective security and support for lever 101. Similarly, the mounting of safety latch 97 between latch 95 and lever 101—all on the same short extension of pin 96—results in a completely operative assembly occupying a minimum spacial area and employing a minimum of parts while providing effective operation of solid and lasting construction.

This application is a continuation-in-part of Serial No. 842,425, filed September 25, 1959.

I claim:

1. In a latching assembly, a keeper-receiving housing formed of at least 3 wall members having a pair of spaced flat parallel side wall members and a flat forward cross wall member joining said parallel side wall members at one edge thereof, said forward cross wall lying in a plane substantially perpendicular to the planes occupied by said parallel side wall members, each of said wall members having a laterally directed flange joined to said wall members by a curved wall portion, a keeper comprising a keeper shaft and a latching enlargement at the distal end of said shaft, said enlargement having conic walls ending in a generally rounded apex, said enlargement having a major diameter only slightly less than the distance between said parallel side walls, a latch element pivotally mounted on said side walls at a point spaced from the upper edges of said side walls and having a latching portion positioned to engage said keeper between said side walls and between said pivot point and said upper edges of said side walls, and yielding means within the housing engaging said housing and said latch and positioned to urge said latch towards said forward cross wall.

2. A latch housing, a keeper formed and adapted to enter said housing, said keeper having a latch-engageable head, said latch housing having a pair of spaced rectilinear side walls, said side walls being spaced apart a distance slightly greater than the major diameter of said keeper head, said housing having a rectilinear forward wall joining said side walls, each of said side walls and said forward wall having an upper, laterally disposed flange portion, said flange portions adjoining the respective walls in a curved plane, apertures formed in said flange portions, said keeper head having conic walls ending in a generally rounded apex adapted to contact said curved portion in response to misaligned penetration of said keeper head and said housing, said forward wall lying in a plane normal to the planes occupied by said side walls, a U-shaped latch bolt having its side walls pivotally mounted on the side wall of said housing, and its latching portion joining said latch bolt side walls and extending forwardly thereof towards said housing forward wall, and yielding means connected to said housing and effective to urge said latch bolt towards said housing forward wall.

References Cited in the file of this patent

UNITED STATES PATENTS

| | | |
|---|---|---|
| 2,781,214 | Claud-Mantle | Feb. 12, 1957 |
| 2,795,450 | Claud-Mantle | June 11, 1957 |
| 2,859,062 | Hynes | Nov. 4, 1958 |